US006430792B1

(12) United States Patent
Foster et al.

(10) Patent No.: US 6,430,792 B1
(45) Date of Patent: Aug. 13, 2002

(54) HYDRAULIC TOOL

(75) Inventors: Dave Foster, Jackson; William Thelen, Onondaga; Benjamin Buzby, Jackson, all of MI (US)

(73) Assignee: Eaton Aeroquip Inc., Maumee, OH (US)

( * ) Notice: Subject to any disclaimer, the term of this patent is extended or adjusted under 35 U.S.C. 154(b) by 0 days.

(21) Appl. No.: 09/591,276

(22) Filed: Jun. 9, 2000

(51) Int. Cl.[7] ................................................ B23P 19/04
(52) U.S. Cl. ........................................................ 29/237
(58) Field of Search .......................... 29/237, 252, 234, 29/282; 72/416, 412, 435.16, 435.15, 435.02

(56) References Cited

U.S. PATENT DOCUMENTS 4,189,817 A 2/1980 Moebius
5,297,325 A 3/1994 Thelen
5,592,726 A 1/1997 Suresh
5,680,687 A 10/1997 Hyatt et al.
5,694,670 A * 12/1997 Hosseinian et al. ........... 29/237

* cited by examiner

*Primary Examiner*—Robert C. Watson
(74) *Attorney, Agent, or Firm*—Rader, Fishman & Grauer PLLC

(57) ABSTRACT

A swaging tool includes a generally tubular housing having a first end portion including a port for providing pressurized fluid, a second end portion defining a closed cylinder and an intermediate portion therebetween that includes an elongated aperture through an outer surface of the housing. A single-piece piston is movably located within the housing, and axially extends through the intermediate housing portion such that at least a portion of the piston is visible through the aperture. A fixed jaw unit is located on the second end portion of the housing and a movable jaw unit is removably engageable directly to the piston through the aperture.

12 Claims, 3 Drawing Sheets

HYDRAULIC TOOL

FIELD OF THE INVENTION

This invention relates to swaging tools for use in swaging fittings, and more particularly to a swaging tool for swaging axially swaged fittings, to join tubes or pipes.

BACKGROUND OF THE INVENTION

Swaged fittings have been used for many years to connect tubes and pipes in various types of fluid systems, including those used in the aircraft, marine, petroleum and chemical industries. A tube end is inserted into a fitting, usually in the form of a cylindrical sleeve, and then the fitting is swaged with a swaging tool to produce a fluid-tight connection around the tube. This swaging operation usually is carried out by applying a radial force that radially compresses the fitting and tubing inwardly. The radial force may be applied directly by the swaging tool or indirectly by a specially shaped ring that is moved axially by the swaging tool to apply a radial force to the fitting. The present invention is directed to the latter type of swaging tool designed for use with fittings having axially movable swaging rings.

Typical axially swaged fittings comprise a cylindrical sleeve having openings at opposite ends for receiving the ends of two tubes to be connected, with a swaging ring at each end of the sleeve. The outer surface of the sleeve and the inner surface of the swaging ring which contact each other are shaped such that axial movement of the swaging ring over the sleeve applies a radial force to the sleeve and, thus, to the tubes. Although not all fittings employ a sleeve with two swaging rings, the use of two swaging rings is necessary when it is desired, as is often the case, to join two tubes to each other.

One type of swaging tool for axially swaged fittings includes a generally cylindrical housing having an inner surface and an outer surface, and a piston that is movable in opposite axial directions within the housing. The piston has a cylindrical outer surface in axial sliding engagement with the inner surface of the housing. The housing has a closed axial end and an open axial end where the open end is threaded and connected to a threaded cap, thereby enclosing the piston within the housing. The cap is connected to a source of hydraulic pressure for selectively moving the piston axially within the housing. A first engaging member is formed on the outer surface of the housing adjacent to the closed end for engaging one of the ring or the sleeve of the fitting to restrain it from axial movement. A second engaging member is formed on the outer surface of the piston for engaging the other one of the ring or the sleeve to move it in an axial direction toward the first engaging member upon movement of the piston toward the closed end of the housing.

While the above-described swaging tool works quite well, it does have its disadvantages. In particular, the housing is slotted to accommodate axial movement of the piston and second engaging member, which are integrally formed together, thereby retaining the second engaging member in place. Therefore, additional parts and structural support, such as a support ring to support the threaded end of the housing during swaging and gussets or legs to support the engaging members, are often necessary to maintain the structural integrity of the swaging tool. Additionally, it is not possible to easily modify or interchange the engaging members to accommodate differently sized swaged fittings.

Attempts have been made to create swaging tools that include relatively easily interchangeable engaging members. One available type of tool includes an elongated housing having an outer surface and defining an inner cylinder that receives a piston. A screw threaded end closure having a pressure fluid inlet closes the end of the cylinder. A piston is axially movable along only a portion of the bore adjacent a first end thereof, and a bar or guide shaft axially extends from a first end of the piston concentrically through the remaining portion of the bore towards a second end of the housing. A movable jaw unit is removably and slidably received on the guide shaft extending axially from the piston through an elongated aperture formed in the housing, and a fixed jaw unit is mounted to the housing second end in confronting relationship to the movable jaw unit. The junction between the shaft and the piston forms a radially extending load-bearing shoulder to support a portion of the movable jaw. A slide arm mounted to the movable jaw unit extends parallel to the cylinder and engages a longitudinal bearing surface on the outside of the cylinder to counteract deflection of the movable jaw unit during a swaging operation. The location of the slide arm along the outside of the cylinder, however, actually aggravates the deflection problem because it significantly increases the distance between the force generating axis (i.e., the piston axis) and the force application axis (i.e., the fitting axis), which, in turn, increases the bending moment on the movable jaw. In addition, as with the swaging tool described above, the threaded end cap requires occasional tightening and therefore increased maintenance of the tool. Moreover, the slide arm is complex to machine and adds undesired stresses to the movable jaw. Additionally, because the movable jaw is not affixed directly to the piston, the increased axial length of the housing prevents use of the tool in confined spaces.

Other types of axial swaging tools include movable jaw units mounted to the piston by a threaded fastener, which itself requires tightening. In addition, the movable jaw unit may include a pad that extends parallel to the cylinder to engage a longitudinal bearing surface on the outside of the cylinder. This pad, like the slide arm described above, increases the bending moment on the movable jaw because it increases the distance between the piston axis and the fitting axis. Another type of removable tool provides a removable jaw unit having a base attached to an annular sleeve for mounting about the outer circumference of a piston. To change the jaw, the entire piston must be disassembled. Moreover, existing tools include large numbers of components, making them complex to assemble and disassemble. Existing tools also require a relatively large retention force in a direction perpendicular to the center axis of the tool to affix the movable jaw in place. However, it has been found that only a small amount of force in a direction perpendicular to the tool center axis is necessary to retain the movable jaw in place. As a result, existing tools having removable or readily replaceable movable jaws are overly complex.

Thus, a swaging tool that includes readily interchangeable engaging members is desired that has fewer maintenance requirements, is lighter in weight, is more reliable in service, and also fits within confined spaces. Moreover, a tool is desired that includes sufficient frictional force in a direction perpendicular to the tool axis to locate the interchangeable engaging member in place.

SUMMARY OF THE INVENTION

The present invention is directed to an axial swaging tool having a readily replaceable movable jaw unit that utilizes frictional force to structurally retain the movable jaw in place, thereby providing a swaging tool that is extremely compact, includes fewer components, is simple to operate, and is lightweight.

The swaging tool includes a generally tubular housing having a first end portion including a port for providing pressurized fluid, a second end portion defining a closed cylinder and an intermediate portion therebetween that includes an elongated aperture through an outer surface of the housing. A single-piece piston is movably located within the housing, and axially extends through the intermediate housing portion such that at least a portion of the piston is visible through the aperture. A compression spring is interposed between a first end of the piston and the housing second end portion to bias the piston toward the housing first end portion. To maintain the spring in place, the piston first end includes an axial bore sized to receive a portion of the spring. A fixed jaw unit is located on the second end portion of the housing and a movable jaw unit is removably engageable directly to the piston.

In one embodiment, the piston includes a reduced external diameter portion axially located between two full diameter portions on the portion of the piston visible through the aperture. The movable jaw includes a base having two radially inwardly extending legs separated by a slot sized to fit about the reduced diameter portion of the piston. The axial length of the reduced diameter portion is slightly larger than the axial thickness of the movable jaw base, such that a tight interference fit is obtained when the base is radially inserted through the aperture to engage the piston reduced diameter portion. The two shoulders formed at the interfaces between the axially separated full diameter portions and the reduced diameter portion provide the required load-bearing support while reducing the bending moment on the movable jaw.

In a second embodiment, the piston includes a single radial bore perpendicular to the piston axis on a portion of the piston visible through the aperture. The movable jaw is generally Y-shaped, having a radially extending base leg that is sized to achieve a tight interference fit when inserted within the radial bore. Additionally, the axial bore that receives the compression spring may extend axially through the piston from the piston first end to the radial bore, thereby allowing the compression spring to exert an axial force on the base leg to position and retain the movable jaw. A detent attached to the spring may further frictionally engage a recess formed in the base leg to position and retain the movable jaw in place.

The swaging tool of the present invention therefore provides a movable jaw that is readily replaceable upon overcoming a slight frictional interference fit between the piston and the movable jaw or between a detent and the jaw. During assembly of a swaged fitting, however, the movable jaw base is completely supported by the piston itself, such that movement of the piston causes corresponding movement of the movable jaw. Moreover, since the piston itself moves in response to introduction of pressurized fluid, thereby moving the movable jaw directly, and since the movable jaw is attached directly to the piston, frictional losses within the tool are minimized, especially over prior art designs. Assembly of the tool is also simplified by minimizing the number of moving parts. Further, since the number of moving parts is reduced, the potential for frictional losses is minimized, while the size of the tool is likewise minimized.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
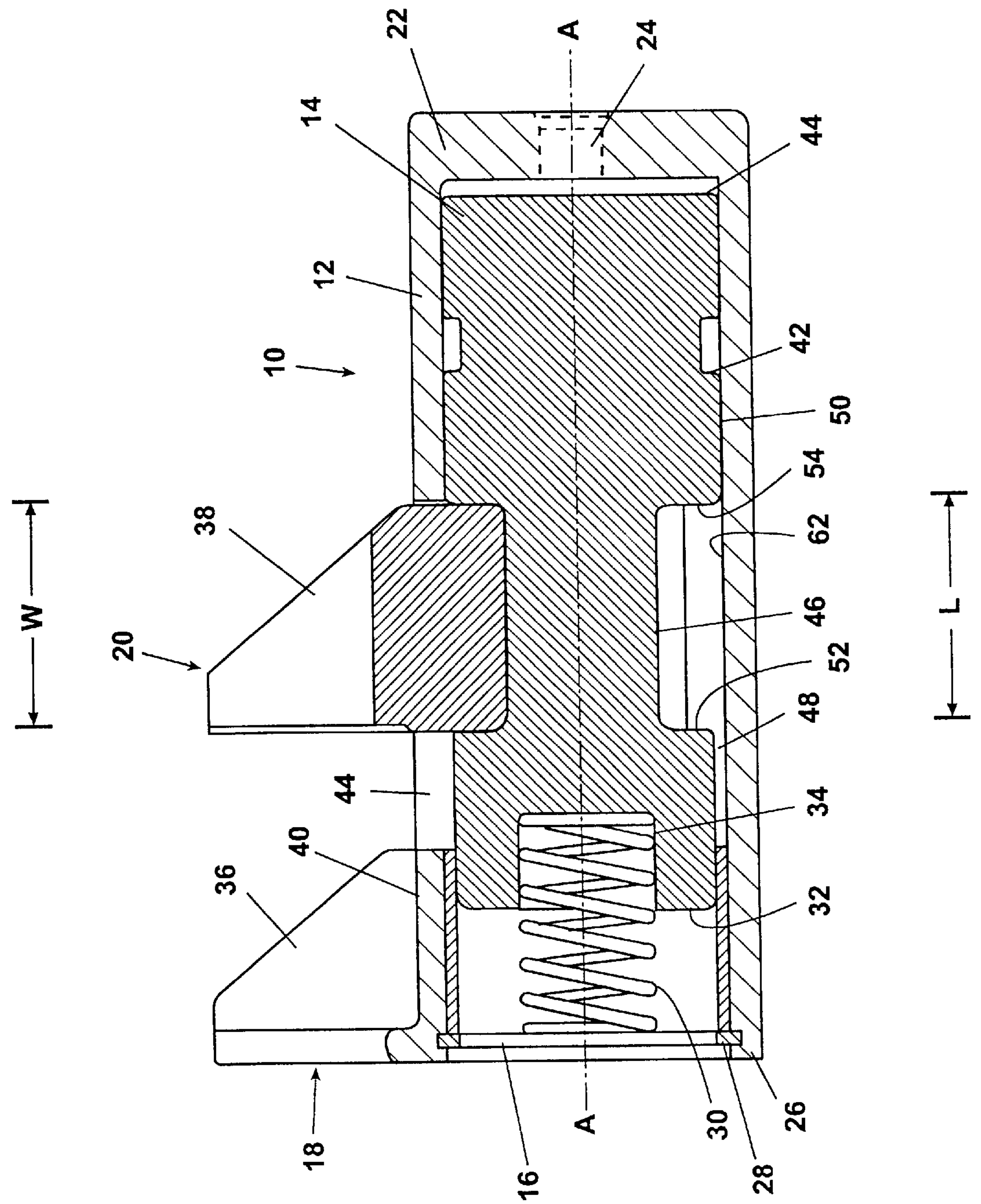
FIG. 1 is a cutaway elevational view of a first embodiment of the axial swaging tool of the present invention.

A first embodiment of an axial swaging tool 10 is shown with reference to FIG. 1. Tool 10 includes a housing 12, a piston 14, an end cap 16 including a fixed jaw 18, and a movable jaw 20 affixed to the piston 14.

Housing 12 is generally tubular in shape, and includes a first end portion 22 that further includes is a port 24 through which pressurized fluid may be introduced into the housing to force the piston in a direction away from the port. End cap 16 is attached to housing 12 at a second housing end portion 26 by any conventional means, including screws, threads, pins and retaining rings. In FIG. 1, a retaining ring 28 serves to hold end cap 16 in place. End cap 16 provides a backstop for a compression spring 30 interposed between housing second end 26 and a second or "dry" (i.e. not in contact with pressurized fluid) end 32 of piston 14 that serves to bias piston 14 toward housing first end 22. As seen in FIG. 1, piston dry end 32 may include a partial axial bore 34 along centerline A—A sized to accommodate and locate spring 30.

Jaws 18 and 20 are formed in accordance with accepted practice in the art, and may include gussets 36, 38, respectively, that limit deflection of the jaws when performing a swaging operation. Fixed jaw 18 is preferably attached to the exterior surface 40 of housing 12 adjacent second end 26. If desired, fixed jaw 18 may be formed as part of removable end cap 16, thereby enabling fixed jaw 18 to be readily replaceable and interchangeable as desired. It should also be understood that end cap 16 may be replaced with a similar cap that includes a second port (not shown) for providing pressurized fluid to housing second end 26 to allow the tool 10 to be used in a reversible manner. However, for the purposes of the following description, the tool 10 will be described as if only one port 24 is available to provide pressurized fluid to move piston 14.

As seen in FIG. 1, piston 14 comprises a single piece sized and shaped to fit within tubular housing 12 with small clearance therebetween. Piston 14 is axially movable within housing 12 along axis A—A, which is typically coaxial with the housing's cylindrical inner surface 62, in response to force provided by either spring 30 or pressurized fluid. The piston may also be provided with a radial groove 42 adjacent piston first or "wet" (i.e. in contact with pressurized fluid) end 44 to allow location of a radial seal (not shown) to prevent blowby of pressurized fluid between piston 14 and housing inner surface 62 or to provide a bearing surface for slideable movement of piston 14, or both. Of course, if a second port were provided at housing second end, then a similar groove would be provided in the piston adjacent the dry end 32.

Piston 14 is also formed so that movable jaw 20 is readily insertable, removable and/or replaceable. To accommodate insertion and removal of movable jaw 20, housing 12 includes an axially extending aperture 44 of sufficient length to allow axial movement of jaw 20 in response to movement of piston 14. According to the first embodiment, piston 14 includes at least one reduced external diameter portion 46 axially located between two larger diameter portions 48, 50 such that the fall diameter portions transition to the reduced diameter portion abruptly at shoulders 52, 54, respectively. As best seen in FIG. 1, reduced diameter portion 46 has an axial length L slightly larger than the width W of movable jaw 20 so that a slight interference fit exists when jaw 20 is inserted into reduced diameter portion 46, thereby allowing jaw 20 to be easily removed and replaced when not in use. Moreover, only frictional force is used to retain jaw 20 on reduced diameter portion 46. However, when jaw 20 is being used in a swaging operation, jaw 20 frictionally contacts at least one of shoulders 52, 54. Accordingly, when piston 14 moves axially, jaw 20 moves with the piston. As the piston moves, shoulders 52, 54 support jaw 20 to substantially eliminate undesired flex or torque due to forces exerted upon a fitting (not shown), and also retaining the jaw in place during the swaging operation.

Figure 2:
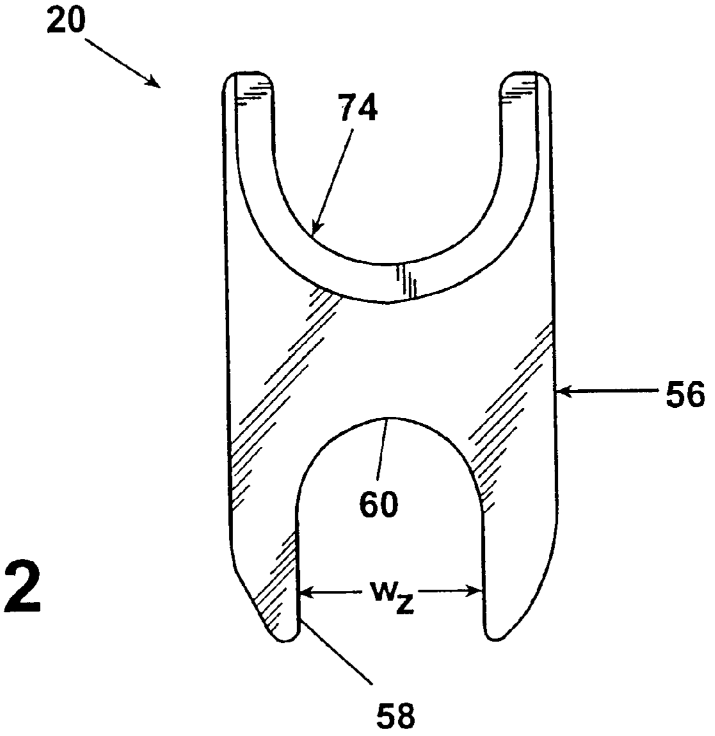
FIG. 2 is an elevational view of the movable jaw of the first embodiment.

In order to fit around piston 14, movable jaw 20 includes a base 56 (FIG. 2) including a slot 58 of sufficient width $W_2$ to fit radially over piston reduced diameter portion 46. Slot 58 also preferably includes a contoured bottom 60 shaped to contact a portion of reduced diameter portion outer surface 46 (see FIG. 1). Contoured bottom 60 is shown in FIG. 2 as being semi-circular in shape, which contemplates that piston reduced diameter portion 46 is generally circular in cross-section. However, the cross-section of reduced diameter portion 46 may be any practical shape, and contoured bottom 60 should be shaped for facing contact therewith.

Figure 4:
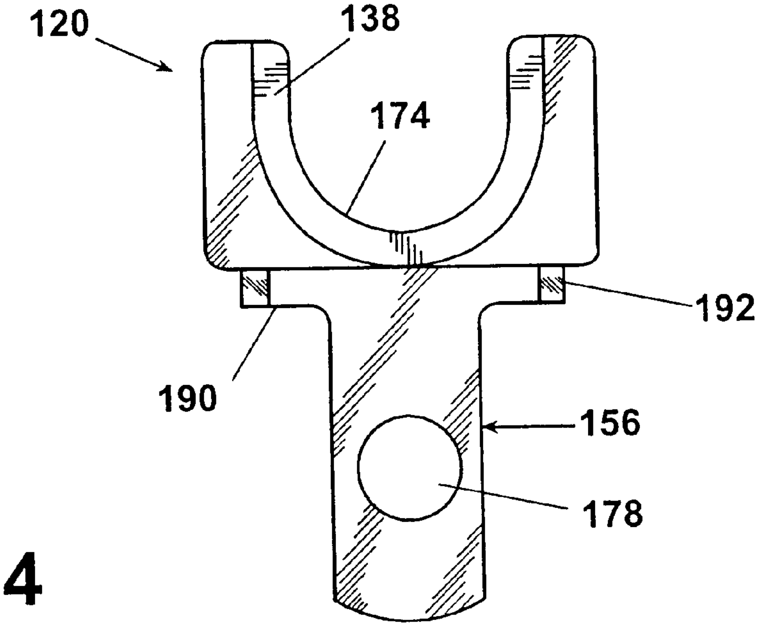
FIG. 4 is an elevational view of the movable jaw of the second embodiment.
Figure 3:
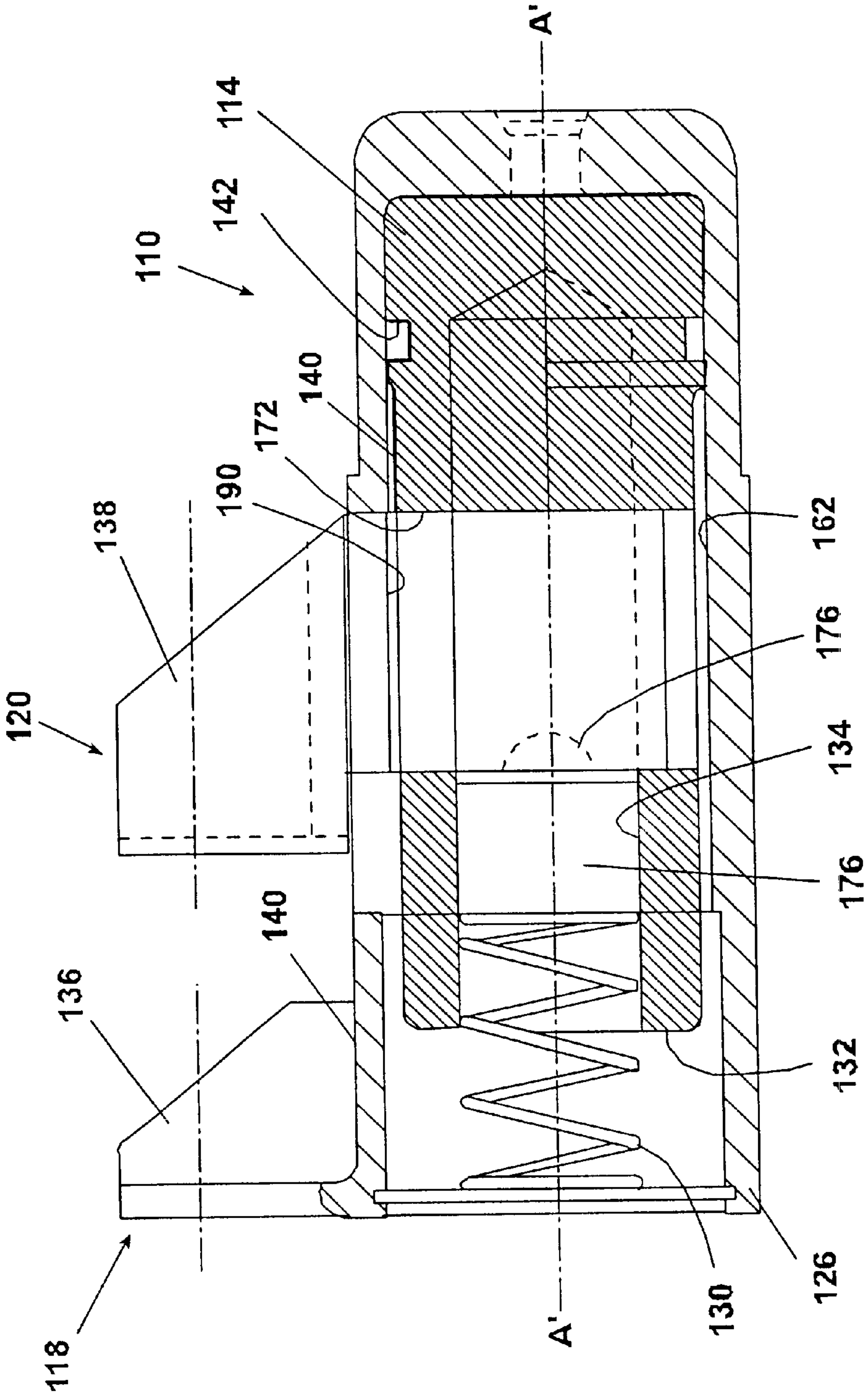
FIG. 3 is a cutaway elevational view of a second embodiment of the present invention.

A second embodiment of a swage tool 110 is shown in FIGS. 3 and 4. Tool 110 includes similarly numbered parts substantially as described above with reference to FIGS. 1 and 2. However, instead of defining a reduced diameter portion, piston 114 is formed with a substantially uniform radial outer diameter 148, except for an optional groove 142 to allow location of a radial seal (not shown) to prevent blowby of pressurized fluid between piston 114 and housing inner surface 162 or to provide a bearing surface for slideable movement of piston 114, or both.

Additionally, as seen in FIG. 3, piston 114 is formed with an increased length axial through-bore 134 and a radial through bore 172. Axial bore 134 is generally concentrically formed about axis A'—A', such that the bore extends at least part of the length of piston 114. In the preferred embodiment, bore 134 extends about one-half the length of piston 114 to the point where it intersects with radial bore 172.

As best shown in FIG. 4, movable jaw 120 is formed into a generally Y-shape having a base leg 156, sized and shaped to be received within radial bore 172, and an upper fitting seat 174. Seat 174 is conventionally sized and shaped to receive a fitting to be swaged, and may include gussets 138, while base leg 156 may be formed into any cross-sectional shape, such as rectangular as shown in FIG. 4. Of course, the cross-sectional shape and size of radial bore 172 should correspond to the cross-sectional shape and size of leg 156, since leg 156 is designed to be received within radial bore 172 such that an underside 190 of seat 174 contacts the external surface 148 of piston 114. Additionally, upper seat 174 may include a shelf 192 that interfits with a correspondingly sized countersunk hole at one end of radial bore 172. Shelf 192 allows tight fitment between jaw 120 and piston 114, and also may be used to properly align jaw 120 upon insertion into the piston. Shelf 192 also supports seat 174 to prevent unwanted torquing or rotational movement of seat 174 during a swaging operation.

As above, a compression spring 130 is interposed between housing second end 126 and a second end 132 of piston 114 and is located within bore 134. However, spring 130 may be longer than spring 30 (FIG. 1) so that a larger portion of spring 130 is received in axial bore 134. Accordingly, axial bore 134 must be radially and axially sized to allow sufficient insertion of the spring. Spring 130 is also used to apply an axial force against base leg 156 to assist in retaining movable jaw 120 in place. To apply the axial force, spring 130 may terminate in a detent 176 that is axially biased by the spring and is received in a corresponding recess 178 formed in the base leg 156. Detent 176 is axially biased by spring 130 into frictional contact with base leg 156. The frictional force may be increased as a function of the strength of spring 130, and may also be increased by contouring the interface between detent 176 and recess 178. As seen in FIGS. 3 and 4, recess 178 and detent 176 are preferably hemi-spherically shaped, but any shape may be used to achieve the desired frictional interface. As an added advantage, the shape of detent 176 and the force of spring 130 may be sufficiently large that shelf 192 may be eliminated, since the interaction between the detent and recess 178 may also serve to locate and properly position the jaw 120 upon insertion into the piston.

In both embodiments, installation or removal of jaw 20, 120 only requires that resistance due to only a slight frictional interference fit or due to the detent 176 be overcome. Moreover, the amount of friction exerted between jaw 20, 120 and piston 14, 114 may be adjusted through tolerances or by increasing the force of spring 130. In any event, it is not necessary to disassemble any part of tool 10 or 110 to replace or insert the movable jaw. Thus, port 24 need never be exposed, thereby reducing the likelihood of introducing contamination within the tool (or the hydraulic fluid). Additionally, only a small number of components are used to fully support heavy loads. In particular, the jaws 20, 120 are completely supported by the pistons 14, 114, and interaction between the jaw and piston is designed to directly transfer the loads therebetween with minimal deflection and frictional losses. Due to the relative simplicity of the design, frictional losses have been found to be reduced by approximately one-half over existing designs. Since losses are reduced, the overall efficiency of the tool is increased, allowing more force to be exerted directly against fittings to be swaged.

Also, since the piston is formed as a single large component, it is structurally more able to both exert and accept heavy loads, and has the additional advantage of reducing manufacturing costs over multiple component piston designs. Moreover, because of the one-piece piston, the size of tool 10 or 110 may be reduced over existing designs without affecting its structural stability.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A swaging tool for swaging a fitting to a tube, comprising:

a tubular housing having first and second ends and an intermediate portion therebetween, said first end of said housing having a port for introducing pressurized fluid, said second end including a fixed jaw, said intermediate portion including a unitary piston axially movable within said housing in response to introduction of pressurized fluid through said port;

a movable jaw removably mounted to said piston through an aperture in said intermediate portion, said aperture sized to allow axial movement of said movable jaw in response to piston movement; and wherein said piston further includes a radial bore visible through said aperture, said movable jaw being generally Y-shaped and including a base leg sized and shaped for insertion into said radial bore when said movable jaw is mounted to said piston.

2. The swaging tool of claim 1, wherein a compression spring is interposed between said housing second end and a first piston end to bias said piston toward said housing first end.

3. The swaging tool of claim 2, wherein said first piston end includes an axial bore for receiving at least a portion of said compression spring.

4. The swaging tool of claim 3, wherein said axial bore terminates at said radial bore.

5. The swaging tool of claim 4, wherein said compression spring applies an axial force against said base leg.

6. The swaging tool of claim 5, wherein said base leg includes a recess sized and located to receive a detent mounted to said compression spring for providing said axial force against said base leg.

7. In a swaging tool for swaging a fitting to a tube, the tool including a generally cylindrical housing having first and second ends and an intermediate portion having an aperture therethrough, and a unitary piston axially movable within the housing, a movable jaw member, comprising:

a generally Y-shaped member having a base leg, said leg sized and shaped to be received within a radial bore in the piston through the aperture to removably mount the movable jaw to the piston.

8. The swaging tool of claim 7, wherein a compression spring is interposed between the housing second end and a first piston end to bias the piston toward said housing first end.

9. The swaging tool of claim 8, wherein said first piston end includes an axial bore for receiving at least a portion of said compression spring.

10. The swaging tool of claim 9, wherein said axial bore terminates at said radial bore.

11. The swaging tool of claim 10, wherein said compression spring applies an axial force against said base leg.

12. The swaging tool of claim 11, wherein said base leg includes a recess sized and located to receive a detent mounted to said compression spring for providing said axial force against said base leg.

* * * * *